(12) United States Patent
Luo et al.

(10) Patent No.: US 7,236,610 B1
(45) Date of Patent: Jun. 26, 2007

(54) AUTHENTICATING EXECUTABLE CODE AND EXECUTIONS THEREOF

(75) Inventors: Chenghui Luo, Johnston, RI (US); Jian Zhao, Rumford, RI (US)

(73) Assignee: Fraunhofer Gesellschaft, Munich (DE)

( * ) Notice: Subject to any disclaimer, the term of this patent is extended or adjusted under 35 U.S.C. 154(b) by 0 days.

(21) Appl. No.: 10/019,827

(22) PCT Filed: May 12, 2000

(86) PCT No.: PCT/US00/13117

§ 371 (c)(1),
(2), (4) Date: May 21, 2002

(87) PCT Pub. No.: WO00/68875

PCT Pub. Date: Nov. 16, 2000

Related U.S. Application Data

(63) Continuation-in-part of application No. 09/070,524, filed on Apr. 30, 1998, now Pat. No. 6,243,480.

(60) Provisional application No. 60/133,840, filed on May 12, 1999, provisional application No. 60/133,848, filed on May 12, 1999.

(51) Int. Cl.
| | |
|---|---|
| G06K 9/00 | (2006.01) |
| G06K 9/36 | (2006.01) |
| G06K 9/46 | (2006.01) |
| H04L 9/00 | (2006.01) |
| H04L 9/32 | (2006.01) |
| G06F 11/00 | (2006.01) |
| G06F 11/30 | (2006.01) |
| G06F 12/14 | (2006.01) |
| G06F 12/16 | (2006.01) |
| G06F 15/18 | (2006.01) |
| G06F 7/04 | (2006.01) |
| G06F 17/30 | (2006.01) |
| G08B 23/00 | (2006.01) |
| H03M 1/68 | (2006.01) |
| H04K 1/00 | (2006.01) |
| H04N 7/16 | (2006.01) |
| G06F 9/44 | (2006.01) |
| G06F 9/445 | (2006.01) |

(52) U.S. Cl. ............... 382/100; 382/232; 713/168; 713/187; 713/188; 713/189; 717/171; 717/176; 726/22; 726/26; 380/277

(58) Field of Classification Search ............ 382/100, 382/232; 713/186, 183, 176, 171, 151–194; 358/3.28; 380/277, 278, 281, 282, 284, 210, 380/252, 287; 717/100, 118, 126, 141; 726/22–33
See application file for complete search history.

(56) References Cited

U.S. PATENT DOCUMENTS

| | | | | |
|---|---|---|---|---|
| 5,231,668 | A * | 7/1993 | Kravitz .................... | 380/28 |
| 5,287,407 | A | 2/1994 | Holmes | |
| 5,287,408 | A * | 2/1994 | Samson .................... | 705/59 |
| 5,343,527 | A * | 8/1994 | Moore .................... | 713/179 |
| 5,559,884 | A * | 9/1996 | Davidson et al. ........... | 713/187 |
| 5,606,609 | A * | 2/1997 | Houser et al. ............ | 713/179 |
| 5,664,018 | A * | 9/1997 | Leighton .................. | 380/54 |
| 5,745,569 | A * | 4/1998 | Moskowitz et al. ......... | 705/58 |
| 5,751,595 | A * | 5/1998 | Beatty et al. .............. | 716/5 |
| 5,757,914 | A * | 5/1998 | McManis ................... | 713/187 |
| 5,822,432 | A * | 10/1998 | Moskowitz et al. ......... | 380/28 |
| 5,892,904 | A * | 4/1999 | Atkinson et al. ........... | 726/22 |
| 5,905,800 | A * | 5/1999 | Moskowitz et al. ......... | 380/28 |
| 6,002,772 | A * | 12/1999 | Saito ....................... | 705/58 |
| 6,006,328 | A * | 12/1999 | Drake ...................... | 726/23 |
| 6,141,756 | A * | 10/2000 | Bright et al. .............. | 726/22 |
| 6,209,092 | B1 * | 3/2001 | Linnartz ................... | 713/176 |
| 6,298,445 | B1 * | 10/2001 | Shostack et al. ........... | 726/25 |

OTHER PUBLICATIONS

Collberg et al, A taxonomy of Obfuscating Transformations, Jul. 1997, Technical Report #148, Department of Computer Science, The University of Aucland, pp. 1-36.*

DIGIMARC Corporation, "Digimarc Watermarking Guide", Digimarc Watermarking Guide, (c) Digimarc Corporation, 2004. http:/www.byte,com/art/9701/sec18/art1.htm printed May 20, 2005.

E. Koch & J. Zhao, "Towards Robust and Hidden Image Copyright Labeling", Procedures of 1995 IEEE Workshop on Nonlinear Signal and Image Processing, Greece, 1995.
Christian Collberg and Clark Thomborson, "Software Watermarking: Models and Dynamic Embeddings", Dept of Computer Science, The Univ. of Auckland, Jan. 1999.

* cited by examiner

*Primary Examiner*—Bhavesh M Mehta
*Assistant Examiner*—Manav Seth
(74) *Attorney, Agent, or Firm*—Gordon E. Nelson

(57) ABSTRACT

The techniques for authenticating executable code employs keys (609) to modify the code (611). In static watermarking, the code is watermarked by using the key to determine positions in the executable code that will specify digits of a watermark value (607). Instructions are inserted at those positions as required to express the value. The inserted instructions do not affect the outputs from the code when the code is executed. The watermarked code is authenticated by using the key (609) to read the value and determining whether it is the proper value for that code. In dynamic watermarking, the code is watermarked using the key (607) to modify the program to produce execution state for an execution of the code that has properties that are determined by the key. Authentication is done by executing the code and comparing (621) the execution state that would have been produced if the program had been watermarked with the key.

27 Claims, 11 Drawing Sheets

```
private void add()
0:   iconst_0
1:   istore_2
2:   iconst_1
3:   istore_1
4:   goto         #14
7:   iload_2
8:   iload_1
9:   iadd
10:  istore_2
11:  iinc         %1      1
14:  iload_1
15:  bipush       100
17:  if_icmple    #7
20:  getstatic    java.lang.System.out
                 Ljava/io/PrintStream;   (48)
23:  nop
24:  new     <java.lang.StringBuffer>  (32)
27:  dup
28:  ldc     "1 + 2 + ... + 100 = "  (3)
30:  nop
31:  invokespecial java.lang.StringBuffer.<init>
                 (Ljava/lang/String;)V  (38)
34:  iload_2
35:  invokevirtual java.lang.StringBuffer.append
                 (I)Ljava/lang/StringBuffer;  (40)
38:  ldc     "" (1)
40:  nop
41:  invokevirtual java.lang.StringBuffer.append
         (Ljava/lang/String;)Ljava/lang/StringBuffer;   (41)
44:  invokevirtual java.lang.StringBuffer.toString
                 ()Ljava/lang/String;  (52)
47:  invokevirtual java.io.PrintStream.println
                 (Ljava/lang/String;)V  (49)
50:  return
```

```
12 putfield #250 <Field java.until.Vector nextSites>
15 aload_0
16 ldc #48 <String "Failed: ">
18 putfield #210 <Field java.lang.String failures>
21 aload_0
22 aload_1
23 putfield #291 <Field DWASuitCase suitcase>
26 aload_0
27 aload_1
28 icovst_4
29 invokevirtual #217 <Method java.lang.Object get(int)>
32 checkcast #119 <Class DWAPolicy>
35 putfield #233 <Field DWAPolicy policy>
38 aload_0
39 aload_1
40 iconst_5
41 invokevirtual #217 <Method java.lang.Object get(int)>
44 checkcast #124 <Class DWASiteInfo>
47 putfield #286 <Field DWASiteInfo siteInfo>
```

AUTHENTICATING EXECUTABLE CODE AND EXECUTIONS THEREOF

CROSS REFERENCES TO RELATED APPLICATIONS

The present patent application claims priority from U.S. Provisional Application 60/133,840, J. Zhao, Watermarking mobile code to detect and deter malicious hosts and 60/133, 848, J. Zhao, Watermarking Java software for copyright protection, both filed 12 May, 1999, and is a continuation-in-part of U.S. Ser. No. 09/070,524, J. Zhao, et al., Digital authentication of documents, filed 30 Apr. 1998 now U.S. Pat. No. 6,243,480. The entire Description of related art, the portion of the Detailed description through the section titled Authentication of identification cards, and FIGS. 1-5 of that application have been incorporated into the present patent application. The new material may be found in the section Authenticating executable code in the Description of related art and in the sections of the Detailed Description beginning with Static watermarking by adding operations that do not affect execution of the executable code.

BACKGROUND OF THE INVENTION

1. Field of the Invention

The invention relates generally to authentication of digital representations and more specifically to authentication of executable code and of executions of executable code.

2. Description of Related Art

Nowadays, the easiest way to work with pictures or sounds is often to make digital representations of them. Once the digital representation is made, anyone with a computer can copy the digital representation without degradation, can manipulate it, and can send it virtually instantaneously to anywhere in the world. The Internet, finally, has made it possible for anyone to distribute any digital representation from anywhere in the world From the point of view of the owners of the digital representations, there is one problem with all of this: pirates, too, have computers, and they can use them to copy, manipulate, and distribute digital representations as easily as the legitimate owners and users can. If the owners of the original digital representations are to be properly compensated for making or publishing them, the digital representations must be protected from pirates. There are a number of different approaches that can be used:

- the digital representation may be rendered unreadable except by its intended recipients; this is done with encryption techniques;
- the digital representation may be marked to indicate its authenticity; this is done with digital signatures; the digital representation may contain information from which it may be determined whether it has been tampered with in transit; this information is termed a digest and the digital signature often includes a digest;
- the digital representation may contain a watermark, an invisible indication of ownership which cannot be removed from the digital representation and may even be detected in an analog copy made from the digital representation; and
- the above techniques can be employed in systems that not only protect the digital representations, but also meter their use and/or detect illegal use.

For an example of a system that uses encryption to protect digital representations, see U.S. Pat. No. 5,646,999, Saito, Data Copyright Management Method, issued Jul. 8, 1997; for a general discussion of digital watermarking, see Jian Zhao, "Look, It's Not There", in: *BYTE Magazine*, January, 1997. Detailed discussions of particular techniques for digital watermarking may be found in E. Koch and J. Zhao, "Towards Robust and Hidden Image Copyright Labeling", in: *Proc. Of Image Processing*, Jun. 20-22, 1995, and in U.S. Pat. No. 5,710,834, Rhoads, Method and Apparatus Responsive to a Code Signal Conveyed through a Graphic Image, issued Jan. 20, 1998. For an example of a commercial watermarking system that uses the digital watermarking techniques disclosed in the Rhoads patent, see *Digimarc Watermarking Guide*, Digimarc Corporation, 1997, available in March, 1998 at http://www.digimarc.com FIG. 1 shows a prior-art system 101 which employs the above protection techniques. A number of digital representation clients 105, of which only one, digital representation client 105(j) is shown, are connected via a network 103 such as the Internet to a digital representation server 129 which receives digital representations from clients 105 and distributes them to clients 105.

Server 129 includes a data storage device 133 which contains copied digital representations 135 for distribution and a management data base 139. Server 129 further includes a program for managing the digital representations 135, a program for reading and writing watermarks 109, a program for authenticating a digital representation and confirming that a digital representation is authentic 111, and a program for encrypting and decrypting digital representations 113. Programs 109, 111, and 113 together make up security programs 107.

Client 105 has its own versions of security programs 107; it further has editor/viewer program 115 which lets the user of client 105 edit and/or view digital representations that it receives via network 103 or that are stored in storage device 117. Storage device 117 as shown contains an original digital representation 119 which was made by a user of client 105 and a copied digital representation 121 that was received from DR Server 129. Of course, the user may have made original representation 119 by modifying a copied digital representation Editor/viewer program 115, finally, permits the user to output digital representations to analog output devices 123. Included among these devices are a display 123, upon which an analog image 124 made from a digital representation may be displayed and a printer 127 upon which an analog image 126 made from the digital representation may be printed A loudspeaker may also be included in analog output devices 123. The output of the analog output device will be termed therein an analog form of the digital representation. For example, if the output device is a printer, the analog form is printed sheet 126; if it is a display device, it is display 124.

When client 105(j) wishes to receive a digital representation from server 129, it sends a message requesting the digital representation to server 129. The message includes at least an identification of the desired digital representation and an identification of the user Manager 131 responds to the request by locating the digital representation in CDRs 135, consulting management data base 139 to determine the conditions under which the digital representation may be distributed and the status of the user of client 105 as a customer. If the information in data base 139 indicates to manager 131 that the transaction should go forward, manager 131 sends client 105(j) a copy of the selected digital representation. In the course of sending the copy, manager 131 may use watermark reader/writer 109 to add a watermark to the distal representation, use authenticator/confirmer 111 to add authentication information, and encrypter/ decrypter 113 to encrypt the digital representation in such a fashion that it can only be decrypted in DR client 105(*j*).

When client 105(*j*) receives the digital representation, it decrypts it using program 113, confirms that the digital representation is authentic using program 111, and editor/viewer 115 may use program 109 to display the watermark. The user of client 105(*j*) may save the encrypted or unencrypted digital representation in storage 117. The user of client 105(*j*) may finally employ editor/viewer 115 to decode the digital representation and output the results of the decoding to an analog output device 123. Analog output device 123 may be a display device 125, a printer 127, or in the case of digital representations of audio, a loudspeaker It should be pointed out that when the digital representation is displayed or printed in analog form, the only remaining protection against copying is watermark 128, which cannot be perceived in the analog form by the human observer, but which can be detected by scanning the analog form and using a computer to find watermark 128. Watermark 128 thus provides a backup to encryption: if a digital representation is pirated, either because someone has broken the encryption, or more likely because someone with legitimate access to the digital representation has made illegitimate copies, the watermark at least makes it possible to determine the owner of the original digital representation and given that evidence, to pursue the pirate for copyright infringement and/or violation of a confidentiality agreement.

If the user of client 105(*j*) wishes to send an original digital representation 119 to DR server 129 for distribution, editor/viewer 115 will send digital representation 119 to server 129. In so doing, editor/viewer 115 may use security programs 107 to watermark the digital representation, authenticate it, and encrypt it so that it can be decrypted only by DR Server 129. Manager 131 in DR server 129 will, when it receives digital representation 119, use security programs 107 to decrypt digital representation 119, confirm its authenticity, enter information about it in management data base 139, and store it in storage 133.

In the case of the Digimarc system referred to above, manager 131 also includes a World Wide Web spider, that is, a program that systematically follows World Wide Web links such as HTTP and FTP links and fetches the material pointed to by the links.

Manager program 131 uses watermark reading/writing program 109 to read any watermark, and if the watermark is known to management database 139, manager program 131 takes whatever action may be required, for example, determining whether the site from which the digital representation was obtained has the right to have it, and if not, notifying the owner of the digital representation.

Authenticating Executable Code

As more and more of the devices attached to networks have become programmable, mobile code has become more and more important. Mobile code is code which is downloaded to a device attached to a network in the course of an interaction between a user of the device and the network (or another device attached to the network) and is then executed as part of the interaction. Mobile code is ubiquitous in the Internet. Many Web pages include mobile code written in the Java™ or ActiveX programming languages. When the Web page is received in a browser, the mobile code is executed by the computer upon which the browser is written. Mobile code is also used to implement features in devices such as cellular telephones. When a user does something with the cellular telephone which requires the feature, mobile code for the feature is downloaded to the cellular telephone and then used in the interactions that involve the feature.

While mobile code is useful, it can be dangerous both to the system that receives the code and to the system that provides the code for downloading. The danger to the receiving system is that the code is not what it appears to be: it may have been modified to include a virus or an Internet worm that can damage the receiving system or it may have been modified to return different or additional data or to return the data to a different location. The danger to the sending system is that the code that is being executed is not the code that was sent. When the sending system is legitimate, it does not want the receiving system to receive code that appears to come from the sending system but has been modified to include a virus or to otherwise change the code's behavior. When the sending system receives data from an execution of the mobile code on the receiving system, the sending system needs to be sure that the data is coming from an execution of the code that the sending system provided to the receiving system.

The dangers posed by mobile code can be reduced by authenticating the code. One way of doing this is authentication with a digest, as described above. There are two difficulties with this kind of authentication:

It only guarantees that the mobile code has not been modified in its trip through the network; it does not guarantee that the code was not modified prior to being sent.

It cannot guarantee that the receiving system is actually executing the code that it received from the sending system.

The kind of authentication needed for mobile code is that provided by watermarking: authentication based on information that is an integral part of the thing being authenticated. The difficulty with applying standard digital watermarking techniques to mobile code is that mobile code is executable code; that is, everything in it is functional. There is thus no "noise" to hide the watermark in and adding "noise" changes the behavior of the program.

Techniques have nevertheless been developed for using watermarks to authenticate executable code. These techniques have fallen into two broad classes: static watermarking and dynamic watermarking. In static watermarking, the watermark can be perceived from the text of the code; for example, IBM researchers used the order in which the code pushed and popped certain registers as a watermark, as disclosed in: Counsel for IBM Corporation. *Software birthmarks*. Talk to BCS Technology of Software Protection Special Interest Group. Microsoft researchers encoded a software serial number in the program's control flow graph, as disclosed in U.S. Pat. No. 5,559,884, Robert Davidson and Nathan Myhrvold, Method and system for generating and auditing a signature for a computer program, September 1996. To authenticate a program using such static watermarks, the sender includes an encrypted representation of the correct value of the property being used to watermark the code and the receiver can decrypt the representation and compare it with the value of the property in the code as received.

In dynamic watermarking, the watermark can be perceived from properties of the execution of the code. Published PCT application WO 99/64973, Callberg, et al., Software watermarking techniques, priority date Jun. 10, 1998, describes program watermarking techniques that are based on the program's dynamic response to a given input string.

While these techniques do make it possible to authenticate executable code, they have significant limitations. In the case of the static watermarking techniques described above, the information used for the watermark is an integral part of the executable code, which means that all copies of the executable code will have the same watermark. Moreover, if the property being used as the basis of the watermark is known, a malicious sender need only modify other aspects of the executable code. As long as the property that is the basis of the watermark is untouched, the modified code will appear to the receiver to be authentic.

In the case of the dynamic watermarking, the dynamic response that provides the watermark is produced by adding additional code to the program being watermarked; Because the additional code is not necessary for the functioning of the program, it can be removed, and when it is removed, the watermark is gone.

It is an object of the inventions disclosed herein to overcome the foregoing problems of using watermarking to authenticate executable code in general and mobile code in particular.

SUMMARY OF THE INVENTION

The invention overcomes the problems by providing techniques for incorporating watermarks into executable code and authenticating the watermarked executable code. In the techniques, the code is watermarked by modifying it in a fashion that is determined by a key. The modifications to the code do not affect its usefulness for its intended purpose. The techniques include techniques for producing and authenticating static watermarks and techniques for producing and authenticating dynamic watermarks. With the static watermarks, the key is used to modify the code so that it includes a watermark value. The watermark value is represented by the presence or absence of certain sequences of executable instructions at positions in the code that are determined by the key. The watermarker adds the sequences of instructions that must be present at the positions specified by the key. The sequences of instructions that are added have no effect on any outputs that result from the execution of the code. Depending on the embodiment, the key, the watermark value, or both may be provided to the authenticating entity.

Authentication of statically-watermarked executable code proceeds as follows: The authenticating entity receives a copy of the watermarked executable code and the key and uses the key to read the watermark value from the watermarked executable code. It then uses the watermark value to determine whether the watermarked executable code is authentic. For example, the watermark value may be a digest made from the executable code prior to watermarking; using the key, the authenticating entity removes the watermark from the executable code and again computes the digest; if it is the same as the watermark value, the executable code is authentic. In other embodiments, the authenticating entity may obtain the watermark value from the source of the code and compare that watermark value with the watermark value represented by the watermark. If they are the same, the code is authentic.

With the dynamic watermarks, the key is used to modify the executable code so that execution of the watermarked code results in execution state which has a property that depends on the key. The execution state with the property may be internal to the program, for example, stack depths during the execution, or it may be part of the program's output. When the execution state is part of the program's output, the property may be an order of elements in the output, additional elements in the output, classes of elements in the output, or constraints that are satisfied by elements of the output. In addition to the watermarked executable code, the watermarker produces a description of the property of the execution state that depends on the key. Depending on the embodiment, the description of the property, the key, or both may be provided to the authenticating entity.

Authentication of dynamically-watermarked executable code is done by using the description of the property provided by the watermarker to confirm that the execution state produced by an execution of the code has the property that depends on the key. One way of doing this is by having the execution provide a description of its execution state to the authenticating entity. The authenticating entity then compares the description received from the entity with the description provided by the watermarker. If they agree, the code that was executed is authentic. Another way of doing this is by having the authenticating entity receive the program's output and apply the description to it in order to determine whether the output has the property required by the key. If the output conforms to the description, the code is authentic. In some embodiments, the key may be used to identify those portions of the output which have the property.

Other objects and advantages will be apparent to those skilled in the arts to which the invention pertains upon perusal of the following Detailed Description and drawing, wherein:

BRIEF DESCRIPTION OF THE DRAWING

FIG. 7 is an example of a Java byte code sequence with a watermark;

FIG. 10 is an execution trace of an execution of a Java byte code; and

Figure 1:
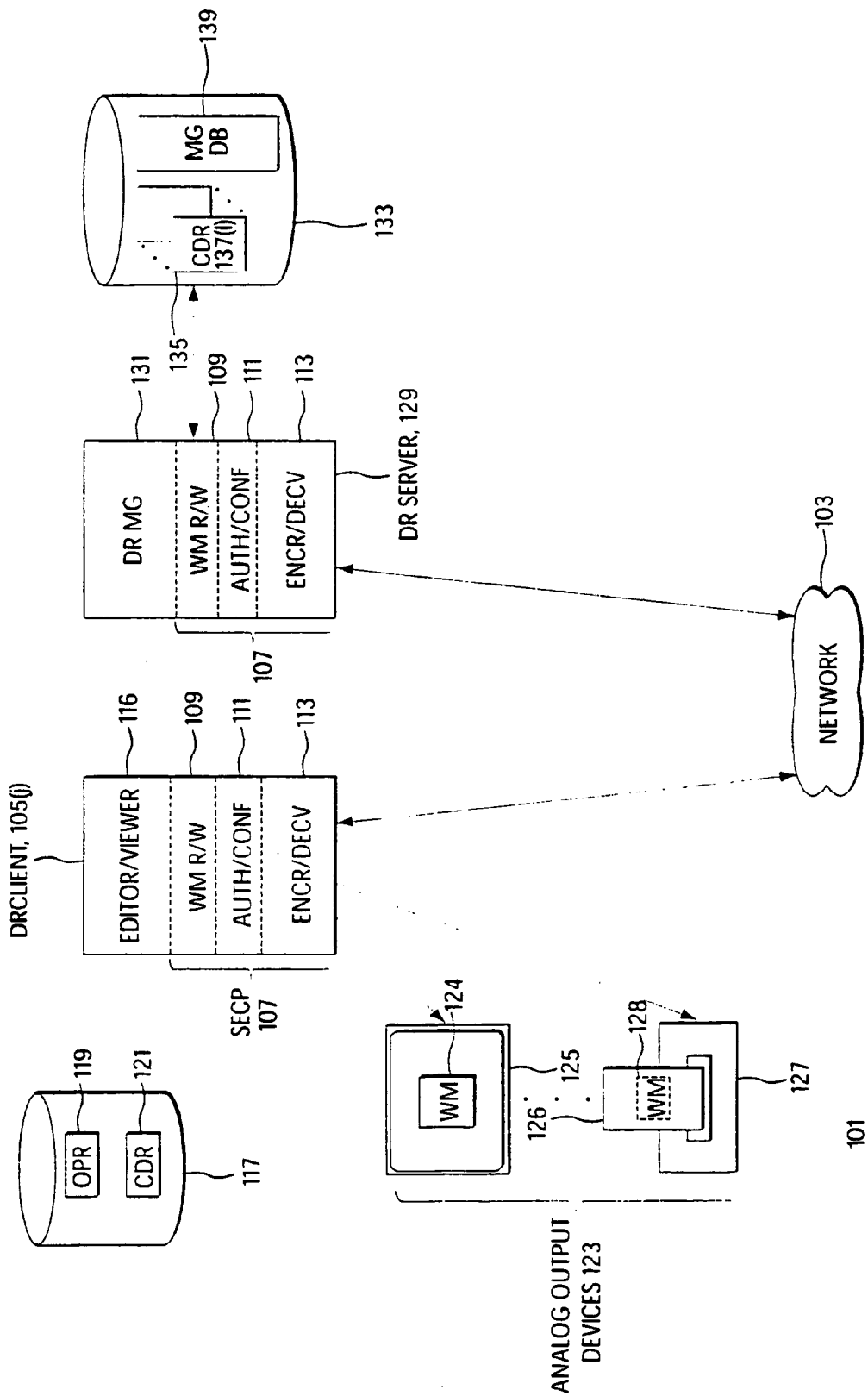
FIG. 1 is a block diagram of a prior-art system for securely distributing digital representations.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first disclose a technique for authenticating digital representations that survives output of an analog form of the digital representation and will then disclose techniques for watermarking executable code.

Authentication that is Preserved in Analog Forms: FIGS. 2-5

Digital representations are authenticated to make sure that they have not been altered in transit. Alteration can occur as a result of transmission errors that occur during the course of transmission from the source of the digital representation to its destination, as a result of errors that arise due to damage to the storage device being used to transport the digital representation, as a result of errors that arise in the course of writing the digital representation to the storage device or reading the digital representation from the storage device, or as a result of human intervention. A standard technique for authentication is to make a digest of the digital representation and send the digest to the destination together with the digital representation. At the destination, another digest is made from the digital representation as received and compared with the first. If they are the same, the digital representation has not changed The digest is simply a value which is much shorter than the digital representation but is related to it such that any change in the digital representation will with very high probability result in a change to the digest.

Where human intervention is a serious concern, the digest is made using a one-way hash function, that is, a function that produces a digest from which it is extremely difficult or impossible to learn anything about the input that produced it. The digest may additionally be encrypted so that only the recipient of the digital representation can read it A common technique is to use the encrypted digest as the digital signature for the digital representation, that is, not only to show that the digital representation has not been altered in transit, but also to show that it is from whom it purports to be from. If the sender and the recipient have exchanged public keys, the sender can make the digital signature by encrypting the digest with the sender's private key. The recipient can use the sender's public key to decrypt the digest, and having done that, the recipient compares the digest with the digest made from the received digital representation. If they are not the same, either the digital representation has been altered or the digital representation is not from the person to whom the public key used to decrypt the digest belongs. For details on authentication, see Section 3.2 of Bruce Schneier, *Applied Crytography*, John Wiley and Sons, 1994.

The only problem with authentication is that it is based entirely on the digital representation The information used to make the digest is lost when the digital representation is output in analog form. For example, if the digital representation is a document, there is no way of determining from a paper copy made from the digital representation whether the digital representation from which the paper copy was made is authentic or whether the paper copy is itself a true copy of the digital representation.

While digital watermarks survive and remain detectable when a digital representation is output in analog form, the authentication problem cannot be solved simply by embedding the digest or digital signature in the watermark. There are two reasons for this:

Watermarking changes the digital representation; consequently, if a digital representation is watermarked after the original digest is made, the watermarking invalidates the original digest, i.e., it is no longer comparable with the new digest that the recipient makes from the watermarked document.

More troublesome still, when a digital representation is output in analog form, so much information about the digital representation is lost that the digital representation cannot be reconstructed from the analog form. Thus, even if the original digest is still valid, there is no way of producing a comparable new digest from the analog form.

What is needed to overcome these problems is an authentication technique which uses information for authentication which is independent of the particular form of the digital representation and which will be included in the analog form when the analog form is output. As will be explained in more detail in the following, the first requirement is met by selecting semantic information from the digital representation and using only the semantic information to make the digest. The second requirement is met by incorporating the digest into the digital representation in a fashion such that it on the one hand does not affect the semantic information used to make the digest and on the other hand survives in the analog form. In the case of documents, an authentication technique which meets these requirements can be used not only to authenticate analog forms of documents that exist primarily in digital form, but also to authenticate documents that exist primarily or only in analog form, for example paper checks and identification cards.

Semantic Information

The semantic information in a digital representation is that portion of the information in the digital representation that must be present in the analog form made from the digital representation if the human who perceive the analog form is to consider it a copy of the original from which the digital representation was made. For example, the semantic information in a digital representation of an image of a document is the representations of the alphanumeric characters in the document, where alphanumeric is understood to include representations of any kind of written characters or punctuation marks, including those belonging to non-Latin alphabets, to syllabic writing systems, and to ideographic writing systems. Given the alphanumeric characters, the human recipient of the analog form can determine whether a document is a copy of the original, even though the characters may have different fonts and may have been formatted differently in the original document. There is analogous semantic information in digital representations of pictures and of audio information In the case of pictures, it is the information that is required for the human that perceives the analog form to agree that the analog form is a copy (albeit a bad one) of the original picture, and the same is the case with audio information In the case of a document written in English, the semantic information in the document is the letters and punctuation of the document. If the document is in digital form, it may be represented either as a digital image or in a text representation language such as those used for word processing or printing. In the first case, optical character recognition (OCR) technology may be applied to the image to obtain the letters and punctuation; in the second case, the digital representation may be parsed for the codes that are used to represent the letters and punctuation in the text representation language. If the document is in analog form, it may be scanned to produce a digital image and the OCR technology applied to the digital image produced by scanning.

Figure 2:
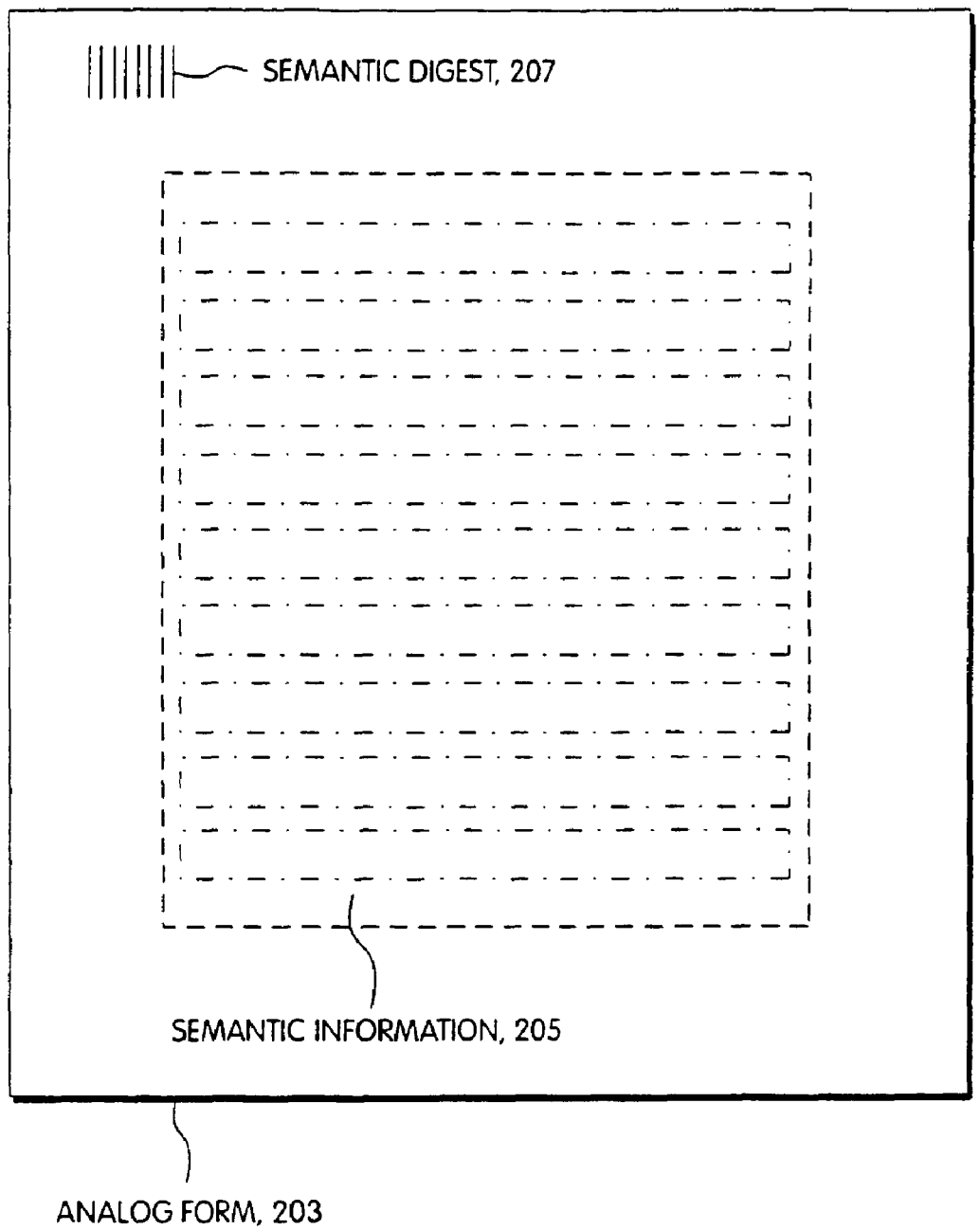
FIG. 2 is a diagram of a first embodiment of an analog form that can be authenticated.
Figure 3:
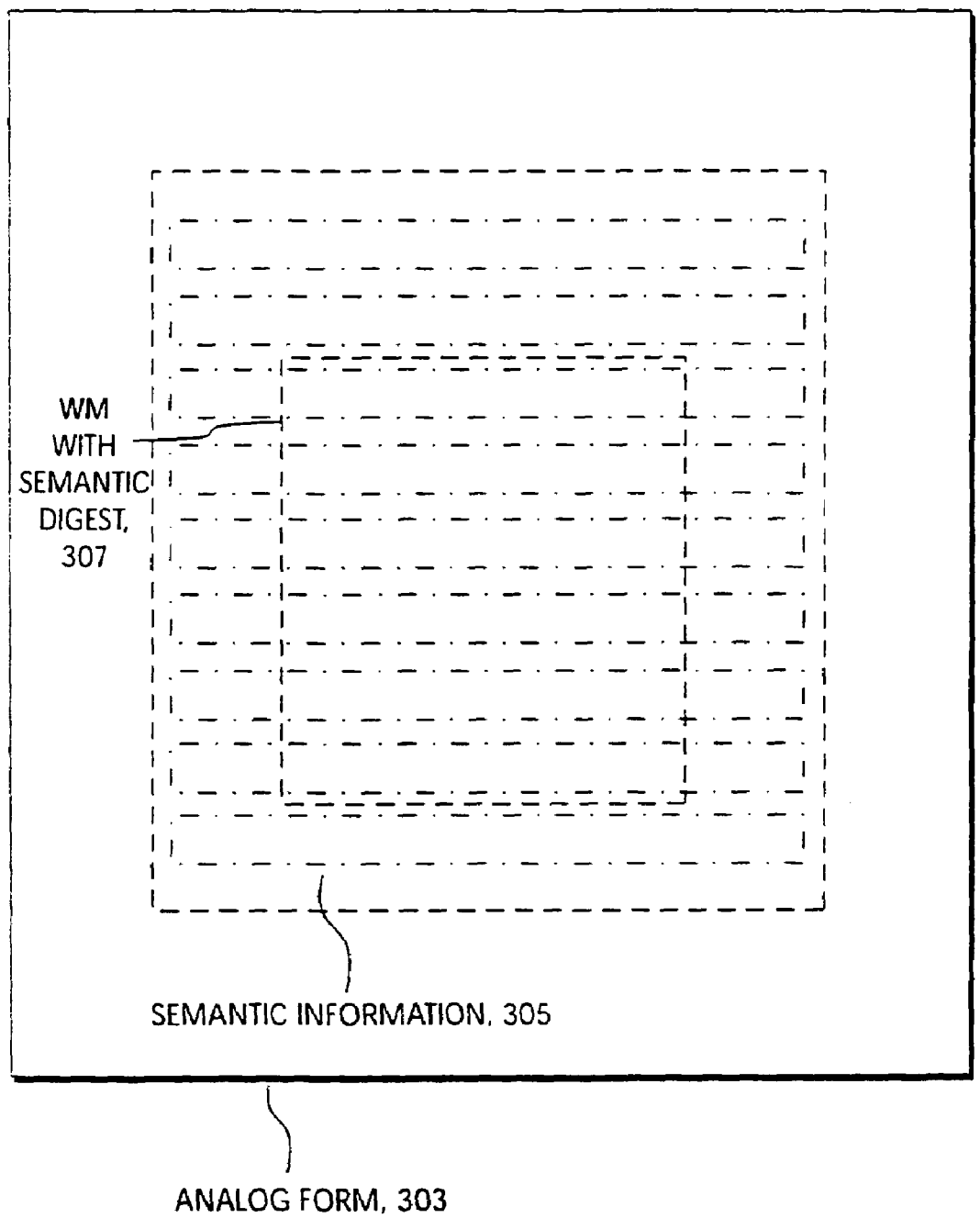
FIG. 3 is a diagram of a second embodiment of an analog form that can be authenticated.

Using Semantic Information to Authenticate an Analog Form: FIGS. 2 and 3

Because the semantic information must be present in the analog form, it may be read from the analog form and used to compute a new digest. If the old digest was similarly made from the semantic information in the digital representation and the old digest is readable from the analog form, the new digest and the old digest can be compared as described in the discussion of authentication above to determine the authenticity of the analog form.

FIG. 2 shows one technique 201 for incorporating the old digest into an analog form 203. Analog form 203 of course includes semantic information 205; here, analog form 203 is a printed or faxed document and semantic information 205 is part or all of the alphanumeric characters on analog form 203. Sometime before analog form 203 was produced, semantic information 205 in the digital representation from which analog form 203 was produced was used to make semantic digest 207, which was incorporated into analog form 203 at a location which did not contain semantic information 205 when analog form 203 was printed. In some embodiments, semantic digest 207 may be added to the original digital representation; in others, it may be added just prior to production of the analog form Any representation of semantic digest 207 which is detectable from analog form 203 may be employed; in technique 201, semantic digest 207 is a visible bar code. Of course, semantic digest 207 may include additional information; for example, it may be encrypted as described above and semantic digest 207 may include an identifier for the user whose public key is required to decrypt semantic digest 207. In such a case, semantic digest 207 is a digital signature that persists in the analog form.

With watermarking, the semantic digest can be invisibly added to the analog form. This is shown in FIG. 3. In technique 301, analog form 303 again includes semantic information 305. Prior to producing analog form 303, the semantic information in the digital representation from which analog form 303 is produced is used as described above to produce semantic digest 207; this time, however, semantic digest 207 is incorporated into watermark 307, which is added to the digital representation before the analog form is produced from the digital representation and which, like the bar code of FIG. 2, survives production of the analog form. A watermark reader can read watermark 307 from a digital image made by scanning analog form 303, and can thereby recover semantic digest 207 from watermark 307. As was the case with the visible semantic digest, the semantic digest in watermark 307 may be encrypted and may also function as a digital signature.

Figure 4:
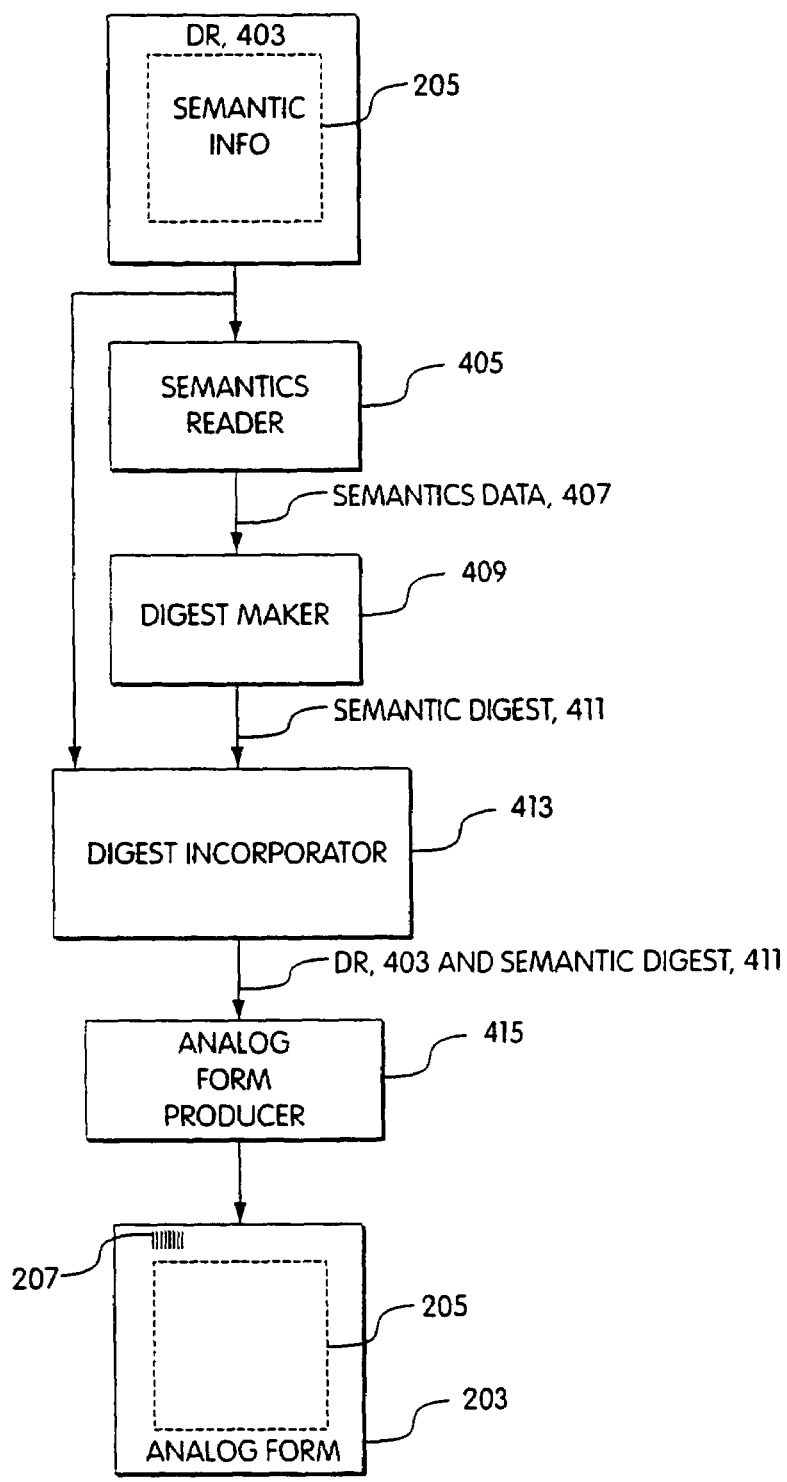
FIG. 4 is a diagram of a system for adding authentication information to an analog form.

Adding a Semantic Digest to an Analog Form: FIG. 4

FIG. 4 shows a system 401 for adding a semantic digest to an analog form 203. The process begins with digital representation 403, whose contents include semantic information 205. Digital representation 403 is received by semantics reader 405, which reads semantic information 205 from digital representation 403. Semantics reader 405's operation will depend on the form of the semantic information. For example, if digital representation 403 represents a document, the form of the semantic information will depend on how the document is represented. If it is represented as a bit-map image, the semantic information will be images of alphanumeric characters in the bit map; if it is represented using one of the many representations of documents that express alphanumeric characters as codes, the semantic information will be the codes for the alphanumeric characters, in the first case, semantics reader 405 will be an optical character reading (OCR) device; in the second, it will simply parse the document representation looking for character codes.

In any case, at the end of the process, semantics reader 405 will have extracted some form of semantic information, for example the ASCII codes corresponding to the alphanumeric characters, from representation 403. This digital information is then provided to digest maker 409, which uses it to make semantic digest 411 in any of many known ways. Depending on the kind of document the semantic digest is made from and its intended use, the semantic digest may have a form which requires an exact match with the new digest or may have a form which permits a "fuzzy" match. Digital representation 403 and semantic digest 411 are then provided to digest incorporator 413, which incorporates a representation 207 of digest 411 into the digital representation used to produce analog form 203. As indicated above, the representation must be incorporated in such a way that it does not affect semantic information 205. Incorporator 413 then outputs the representation it produces to analog form producer 415, which produces analog form 203 in the usual fashion. Analog form 203 of course includes semantic information 205 and representation 207 of semantic digest 411. Here, the bar code is used, but representation 207 could equally be part of a watermark, as in analog form 303 Components 405, 409, and 413 may be implemented as programs executed on a digital computer system; analog form producer 415 may be any device which can output an analog form.

Authenticating an Analog Form that has a Semantic Digest

Figure 5:
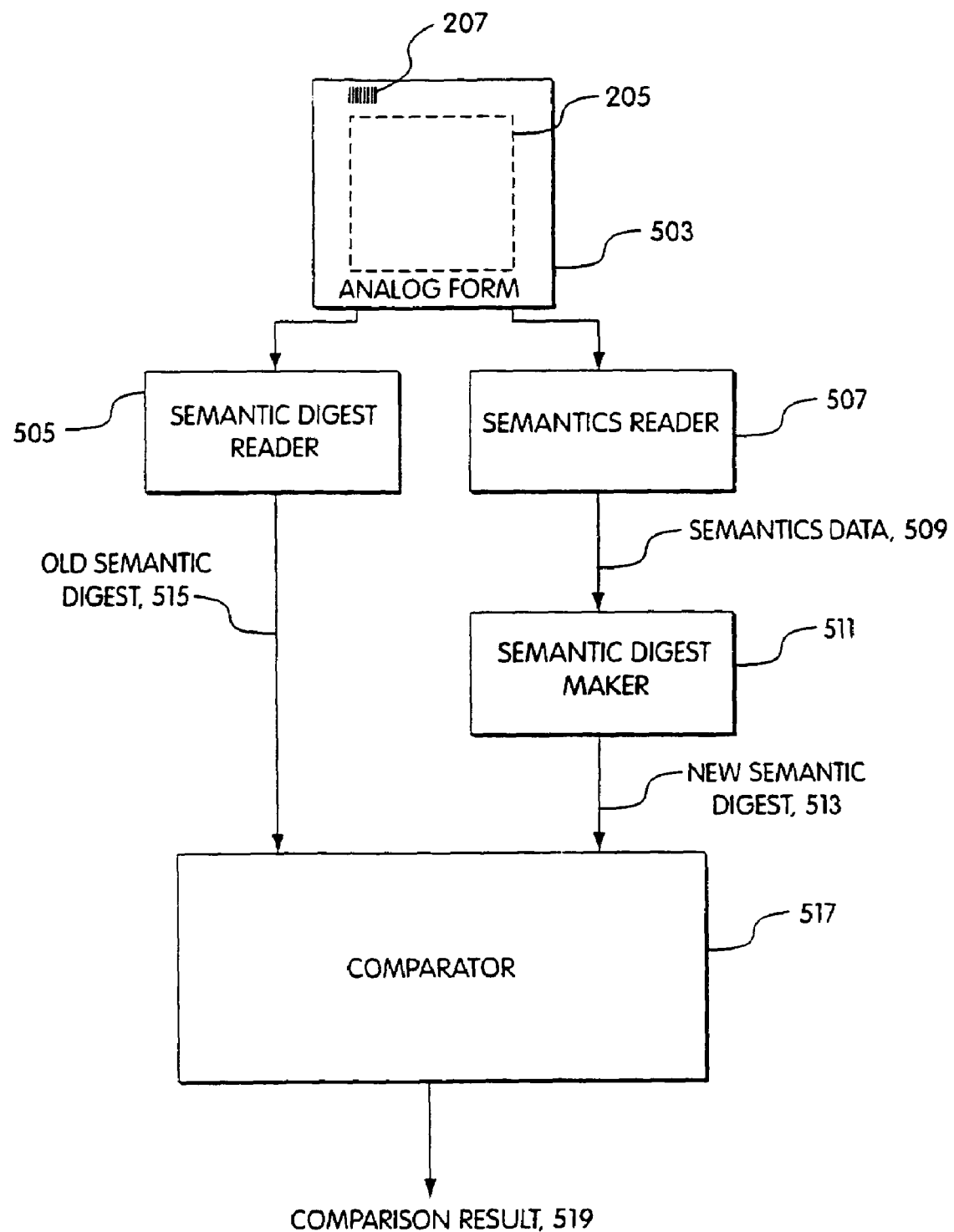
FIG. 5 is a diagram of a system for authenticating an analog form.

FIG. 5 shows a system 501 for authenticating an analog form 503 that has a semantic digest 207. Analog form 503 is first provided to semantic digest reader 505 and to semantics reader 505. Semantic digest reader 505 reads semantic digest 207; if semantic digest 207 is a bar code, semantic digest reader 505 is a bar code reader; if semantic digest 207 is included in a digital watermark, semantic digest reader 505 is a digital watermark reader which receives its input from a scanner. If semantic digest 505 must be decrypted, semantic digest reader 505 will do that as well. In some cases, that may require sending the encrypted semantic digest to a remote location that has the proper key.

Semantics reader 507 reads semantic information 305. If analog form 503 is a document, semantics reader 507 is a scanner which provides its output to OCR software. With other images, the scanner provides its output to whatever image analysis software is required to analyze the features of the image that make up semantic information 305. If analog form 503 is audio, the audio will be input to audio analysis software. Once the semantics information has been reduced to semantics data 509, it is provided to semantic digest maker 511, which makes a new semantic digest 513 out of the information. To do so, it uses the same technique that was used to make old semantic digest 515. Comparator 517 then compares old semantic digest 515 with new semantic digest 513; if the digests match, comparison result 519 indicates that analog form 203 is authentic; if they do not, result 519 indicates that they are not authentic. What "match" means in this context will be explained in more detail below.

"Matching" Semantic Digests

With the digests that are normally used to authenticate digital representations, exact matches between the old and new digests are required. One reason for this is that in most digital contexts, "approximately correct" data is useless; another is that the one-way hashes normally used for digests are "cryptographic", that is, the value of the digest reveals nothing about the value from which it was made by the hash function, or in more practical terms, a change of a single bit in the digital representation may result in a large change in the value produced by the hash function. Since that is the case, the only comparison that can be made between digests is one of equality.

In the context of authenticating analog forms, the requirement that digests be equal causes difficulties The reason for this is that reading semantic information from an analog form is an error-prone operation. For example, after many years of effort, OCR technology has gotten to the point where it can in general recognize characters with 98% accuracy when it begins with a clean copy of a document that is simply formatted and uses a reasonable type font. Such an error rate is perfectly adequate for many purposes; but for semantic information of any size, a new digest will almost never be equal to the old digest when the new digest is made from semantics data that is 98% the same as the semantics data that was used to make the old semantic digest. On the other hand, if the semantics data obtained from the analog form is 98% the same as the semantics data obtained from the digital representation, there is a very high probability that the analog form is in fact an authentic copy of the digital representation.

Precise Matches

Of course, if the semantic information is limited in size and tightly constrained, it may be possible to require that the digests be exactly equal. For example, many errors can be eliminated if what is being read is specific fields, for example in a check or identification card, and the OCR equipment is programmed to take the nature of the field's contents into account For example, if a field contains only numeric characters, the OCR equipment can be programmed to treat the letters o and O as the number 0 and the letters l, i, or I as the number 1. Moreover, if a match fails and the semantic information contains a character that is easily confused by the OCR equipment, the character may be replaced by one of the characters with which it is confused, the digest may be recomputed, and the match may again be attempted with the recomputed digest Fuzzy Matches Where the semantic information is not tightly constrained, the digests must be made in such a fashion that closely-similar semantic information produces closely-similar digests When that is the case, matching becomes a matter of determining whether the difference between the digests is within a threshold value, not of determining whether they are equal. A paper by Marc Schneider and Shih-Fu Chang, "A Robust Content Based Digital Signature for Image Authentication", in: *Proceedings of the* 1996 *International Conference on Image Processing*, presents some techniques for dealing with related difficulties in the area of digital imaging. There, the problems are not caused by loss of information when a digital representation is used to make an analog form and by mistakes made in reading analog forms, but rather by "lossy" compression of images, that is, compression using techniques which result in the loss of information. Because the lost information is missing from the compressed digital representation, a digest made using cryptographic techniques from the compressed digital representation will not be equal to one made from the digital representation prior to compression, even though the compressed and uncompressed representations contain the same semantic information. Speaking generally, the techniques presented in the Schneider paper deal with this problem by calculating the digest value from characteristics of the image that are not affected by compression, such as the spatial location of its features. Where there are sequences of images, the digest value is calculated using the order of the images in the sequences.

Analogous approaches may be used to compute the semantic digest used to authenticate an analog form. For example, a semantic digest for a document can be computed like this:

1. Set the current length of a digest string that will hold the semantic digest to "0";
2. Starting with the first alphanumeric character in the document, perform the following steps until there are no more characters in the document:
   a. Select a next group of characters;
   b. For the selected group,
      i. replace characters in the group such as O, 0, o; I, i, 1, l: or c, e that cause large numbers of OCR errors with a "don't care" character;
      ii. make a hash value from the characters in the group;
      iii. append the hash value to the semantic digest string;
   c. return to step (a).
3. When there are no more characters in the document, make the semantic digest from the digest string.

When computed in this fashion, the sequence of values in the semantic digest string reflects the order of the characters in each of the sequences used to compute the digest. If the sequence of values in the new semantic digest that is computed from the analog form has a high percentage of matches with the sequence of values in the old semantic digest, there is a high probability that the documents contain the same semantic information.

Applications of Authentication with Analog Forms

One area of application is authenticating written documents generally. To the extent that the document is of any length and the digest is computed from a significant amount of the contents, the digest will have to be computed in a fashion which allows fuzzy matching. If the digest is computed from closely-constrained fields of the document, exact matching may be employed.

Another area of application is authenticating financial documents such as electronic cash, electronic checks, and bank cards. Here, the fields from which the digest is computed are tightly constrained and an exact match may be required for security. In all of these applications, the digest or even the semantic information itself would be encrypted as described above to produce a digital signature.

Universal Paper & Digital Cash

Digital cash is at present a purely electronic medium of payment. A given item of digital cash consists of a unique serial number and a digital signature. Authentication using semantic information permits digital cash to be printed as digital paper cash. The paper cash is printed from an electronic image which has a background image, a serial number, and a money amount. The serial number and the money amount are the semantic information. The serial number and the money amount are used to make a digital signature and the digital signature is embedded as an electronic watermark into the background image. The paper cash can be printed by any machine which needs to dispense money Thus, an ATM, can dispense digital paper cash instead of paper money. Similarly, a vending machine can make change with digital paper cash and a merchant can do the same. The digital paper cash can be used in the same way as paper money. When a merchant (or a vending machine) receives the digital paper cash in payment, he or she uses a special scanner (including OCR technology and a watermark reader) to detect the watermark (i.e. the serial number and money amount) from the printed image, and send them to the bank for verification in the same fashion as is presently done with credit cards.

Digital Checks

Digital checks can be made using the same techniques as are used for digital paper cash The digital check includes a background image, an identifier for the bank account, an amount to be paid, and the name of the payer. The payer's private key is used to make a digital signature from at least the identification of the bank and the amount to be paid, and the digital signature is embedded as an electronic watermark in the background image Writing a digital check is a three-step process: enter the amount, produce the digital signature from the bank account number and the amount using the payer's private key, and embed the digital signature into the background image. The bank verifies the check by detecting the watermark from the digital check, decrypting the digital signature with the payer's public key, and comparing the bank account number and the amount from the image with the bank account number and the amount on the face of the check. A digital check can be used in either electronic form or paper form. In the latter case, a scanner (including OCR technology and watermark reader) is needed to read the watermark from the paper check.

Authentication of Identification Cards

The techniques described above for authenticating digital paper cash or digital checks can be used with identification cards, including bankcards. The card number or other identification information appears on the face of the card, is encrypted into a digital signature, and the digital signature is embedded as a digital watermark in the background image of the bankcard. The encryption can be done with the private key of the institution that issues the card. The merchant uses a scanner to read the digital signature containing the card number or other ID from the card, decrypts the digital signature, and compares the value thus obtained with the information on the face of the card. This technique can of course be combined with conventional authentication techniques such as the holographic logo.

Figure 6:
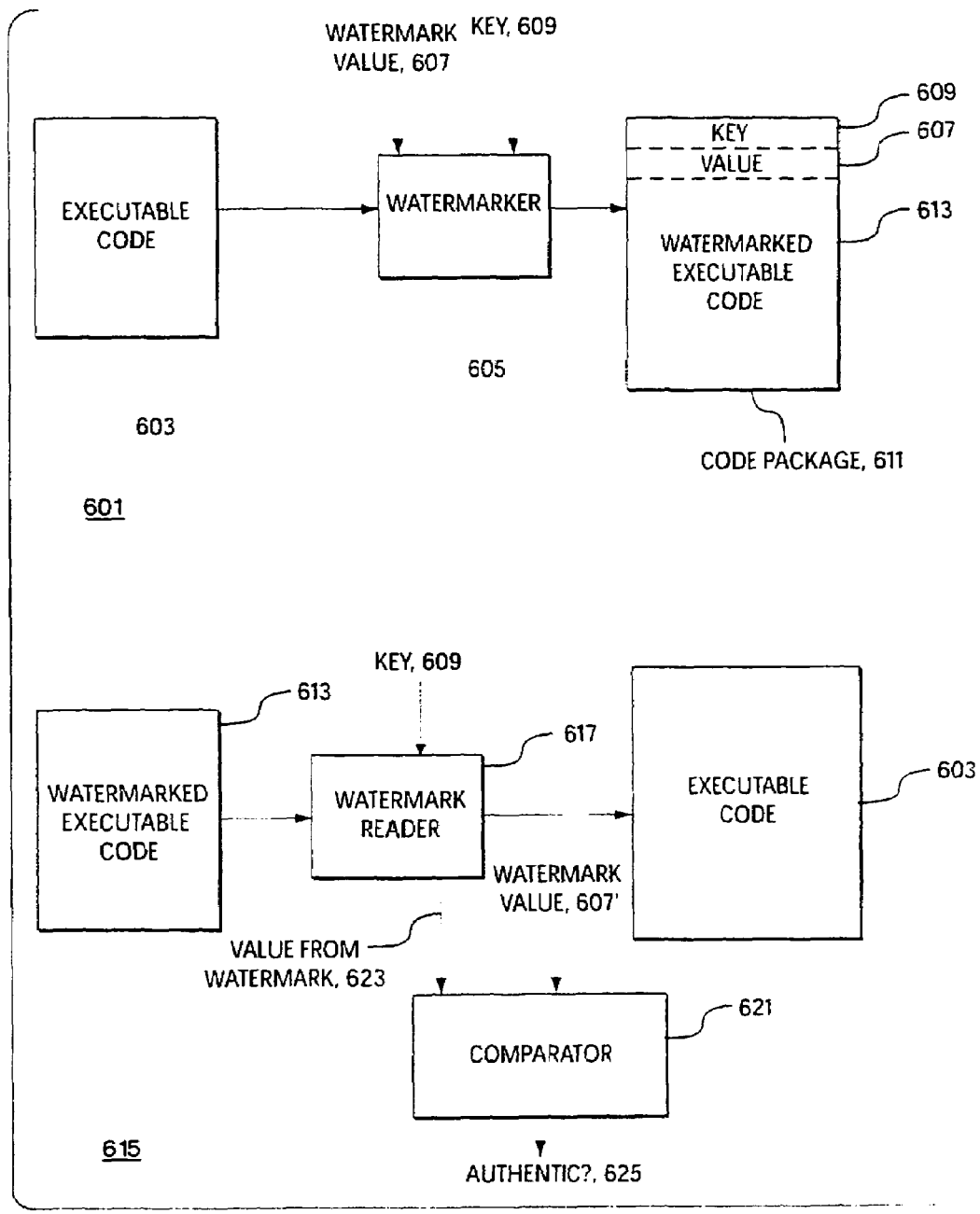
FIG. 6 is a block diagram of watermark creation and watermark reading.
Figure 8:
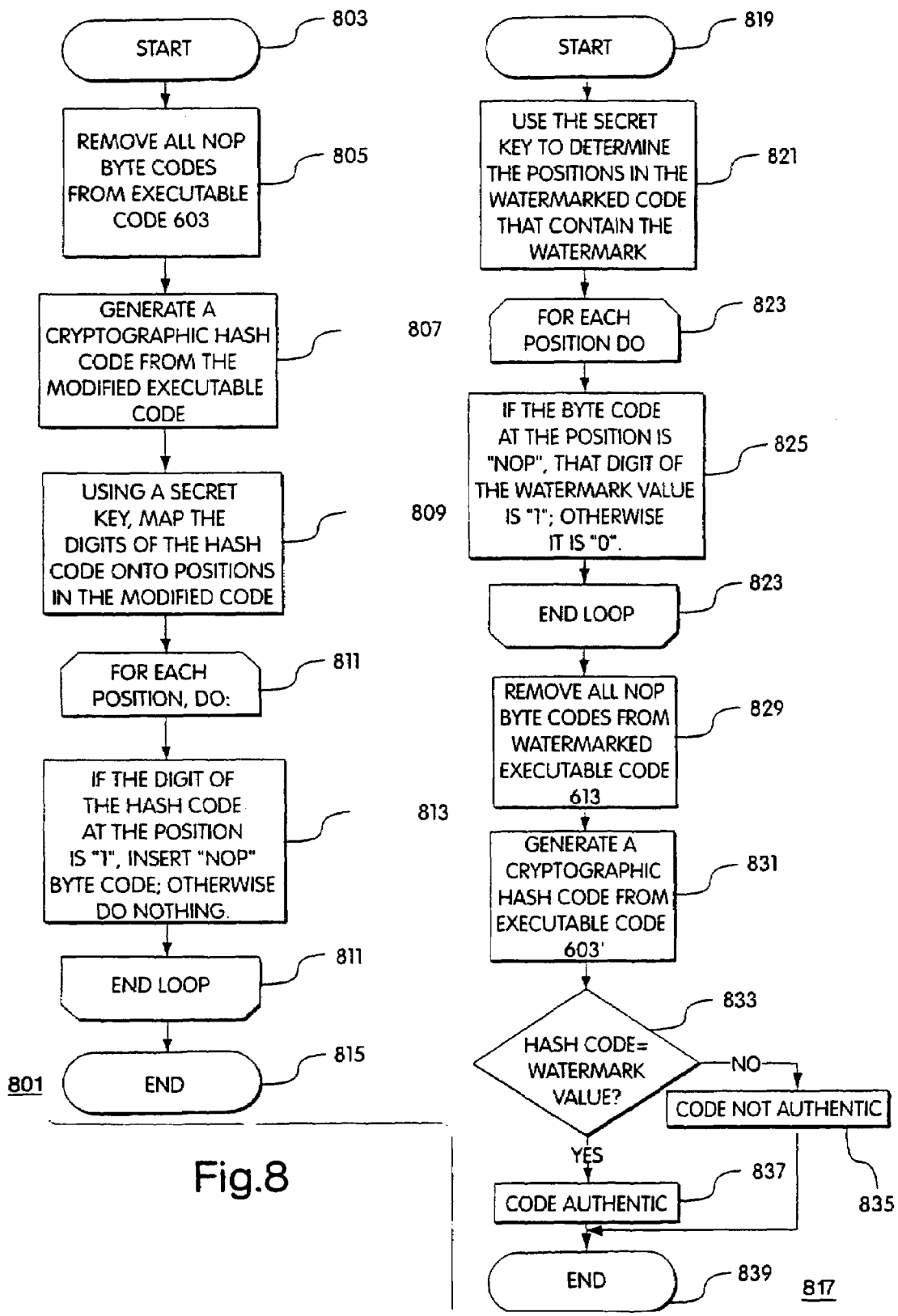
FIG. 8 is flowcharts for adding a watermark to a Java byte code sequence and using the watermark to authenticate the Java byte code.

Static Watermarking by Adding Operations that do not Affect Execution of the Executable Code: FIGS. 6-8

The techniques described in the foregoing for using digital watermarks to authenticate analog documents made from digital representations can be adapted to the static watermarking of executable code. These techniques work by making a watermark that contains a value that is based on semantic information that is preserved in the analog document and that is itself readable in the analog document, so that the analog document can be authenticated by comparing the value contained in the watermark with a new value that is based on the semantic information. In executable code, the semantic information contained in the code is the processing which is done when the code is executed. A value to be used in watermarking can be derived from this semantic information in the same way that such a value can be derived from the text of a document. The problem with watermarking executable code is finding a way to add the watermark to the code in such a fashion that two conditions are fulfilled:

the watermark does not change the semantics of the code; and removal of the watermark is detectable.

FIG. 6 is a block diagram that shows in overview how a static watermark that fulfills the above two conditions may be added to executable code and then used to authenticate the executable code. Making and adding the watermark are shown at 601. Executable code 603 is input to watermarker 605 along with a value 607 that is to be contained in the watermark and a key 609 that determines where the watermark will be located in the watermarked code. Watermarker 605 takes executable code 603 and makes the watermark by adding byte codes that do not affect the execution of executable code 603 at locations specified by key 609 in such fashion that the added instructions together with certain of the original instructions represent value 607.

Watermark value 607 and key 609 are required to read the watermark in watermarked executable code 613, and therefore must be available to the system that is doing the reading. One way of making them available is to include them in a code package 611 containing watermarked code 613; where necessary, key 609, value 607, or both may be encrypted so that they can be read only by the system that is doing the reading. Another way of making value 607 available is to employ a value that is computable from unwatermarked executable code, and key 609 may be a key that belongs to the system that is reading the watermarked code. Code package 611 is then sent to the receiving system.

At 615 is shown how watermarked executable code 613 is authenticated in the receiving system. Watermarked executable code 613 from package 611 and key 609 are input to watermark reader 617, which uses key 609 to locate and interpret the instructions in watermarked executable code 613 that represent watermark value 607. Having located the instructions, watermark reader 617 reads watermark value 623 from them and removes the added instructions from watermarked executable code 613, leaving executable code 603', which is identical with executable code 603. If code package 611 includes watermark value 607, the value is the source of watermark value 607' which is compared with watermark value 623 in comparator 621. If they match, executable code 603 is authentic; if not, it is not. In other embodiments, watermark value 607' may be recomputed from executable code 603. For example, watermark value 607 may be a digest of executable code 603, and watermark value 607' may be obtained by computing a digest of executable code 603' in the same fashion that watermark value 607 was computed from executable code 603.

FIG. 7 shows a printed representation 701 of a sequence of Java byte codes which has been watermarked using the technique described above. Watermarker 605 has added three Java nop byte codes 203(a . . . c) at locations specified by key 609. The Java virtual machine responds to a nop byte code by doing nothing whatever. Addition of the nop byte codes thus does not affect the semantics, that is the execution of executable code 603. Each nop byte code is a binary digit of watermark value 607. In a preferred embodiment, key 609 specifies the locations of the added nop byte codes and the locations of other byte codes. In a preferred embodiment, the locations with nop byte codes represent the binary value "1", while the locations with other byte codes represent the binary value "0". This could of course be reversed, and key 609 could also specify a value in a different representation of numeric values.

FIG. 8 is flowcharts showing how watermarks are used to authenticate Java byte codes in a preferred environment. Flowchart 801 shows how the watermark is created and inserted into the Java byte codes. Starting at 803, the first step is to remove all nop byte codes from the Java byte code being authenticated (805). Then a cryptographic digest is generated from the modified Java byte code (807). Thereupon, a secret key is used to map the digest onto positions in the modified Java byte code (809). Finally, in loop 811, for each position, if the digit of the digest at the position is "1", insert nop; if it is "0", do nothing.

Flowchart 817 shows how the watermark made in flowchart 801 is read and used to authenticate the watermarked byte code. Starting at 819, the first step is to use the secret key to determine the positions in the byte code that contain the watermark (821). Then in loop 823, each of the indicated positions is examined; if the position contains a nop byte code, the corresponding digit of watermark value 623 is "1"; otherwise, it is "0" (825). Watermark value 623 is of course the digest generated from the byte code after all nop codes have been removed; consequently, in step 829, all nop byte codes are removed from watermarked executable code 613. In step 831, a new digest is generated from the watermarked executable code that has had its nop codes removed; if the new digest matches watermark value 623 (833), the watermarked byte code is authentic (837); otherwise it is not (835).

The technique described above will work not only with the nop byte code, but also with any byte code or sequence of byte codes that does not affect the results of the execution of the byte code. For example, a pair of byte codes which first pop a value off a stack and then pushes the value back on the stack may be used in the same fashion as the nop byte code. The technique is also not limited to Java byte codes, but may be used with any kind of executable code.

Figure 9:
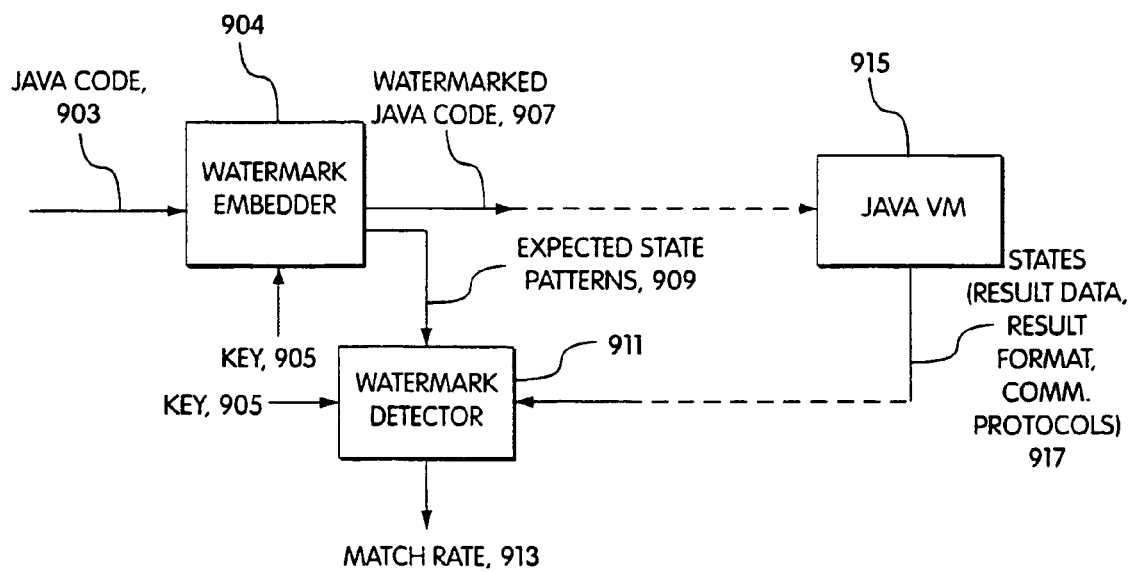
FIG. 9 is a block diagram of apparatus for adding dynamic watermarks to executable code and using the watermark to authenticate the executable code.

Techniques for Dynamic Watermarking: FIG. 9

Dynamic watermarking of executable code is based on the fact that the execution of a program results in the dynamic production of information. The information produced by the execution defines sequence of states. These states are termed herein execution states. Properties of a program's execution states can be used to identify the program, and thus to authenticate the program. One way of doing this is to make a record of the relevant properties of the execution states during an execution of the authentic program. To determine whether another execution was an execution of the authentic program, one makes a record of the relevant properties of the other execution and compares it with the record made during the execution of the authentic program; if they are the same, the other execution was an execution of the authentic program. The relevant properties may of course include data output by the program.

Execution states can be used to authenticate an execution of mobile code on a receiving system to the system that sent the mobile code, to authenticate the execution to another system that uses outputs from the execution of the mobile code on the receiving system, or to authenticate the execution on the receiving system itself (in this case, the authentication confirms that the received code is authentic). In all of these cases, the mobile code is watermarked by modifying it to produce execution states which can be examined to determine whether the code that was executed was authentic. The execution states that are to be examined must have two characteristics:

any modification of the watermarked code must affect those states and
  the execution states must be predictable in a given execution environment.

The entity that is to authenticate the execution of the mobile code must have a description of the execution states that are to be examined. The description must specify the states and what their expected values are. The authenticating entity then compares the states resulting from the execution with the description; if they match, the execution is an execution of authentic code. If the description is to be sent to the authenticating entity via a network, it can be protected using the usual encryption techniques.

An instance of a given item of mobile code may have one or more of a large number of different and constantly changing watermarks; thus, although an unauthorized person might make a version of the mobile code that contained one of the watermarks, making versions for all of the watermarks would be impractical.

FIG. 9 is a block diagram of apparatus for dynamically watermarking Java byte codes. Byte codes 903 are input to watermark embedder 904 together with a key 905. Key 905 determines how byte codes 903 are modified to produce execution states that can be observed to determine whether the code that was executed was authentic. Watermark embedder 904 produces as its outputs watermarked byte code 907 and expected state patterns 909, which is a description of state patterns that will result from an execution of watermarked Java code 907. When Java virtual machine 915 executes watermarked Java code 907, the result is a sequence of execution states. Those states 917 that are relevant for determining the authenticity of the executed code are returned to watermark detector 911. The other inputs for watermark detector 911 are the key 905 used to make watermarked Java code 907 and the expected state patterns 909. Key 905 determines which of the state patterns in expected state patterns 909 and returned states 917 are to be examined, and watermark detector 911 compares those state patterns in 909 and 917. If the match is close enough, the executed code was authentic. When apparatus 901 is used with mobile code, watermark detector 911 will be located at the authenticating entity, be it the sending system, the receiving system, or a third system which receives outputs from the mobile code.

Kinds of Execution States that May be Used for Dynamic Watermarking

While any execution states that satisfy the criteria mentioned above may be used in dynamic watermarking, two types of execution state have been found to be particularly useful:

execution state that, when the executed code is authentic, satisfies a protocol defined between the entity that is authenticating the execution and the entity that is performing the execution; and
  execution state that gives an execution trace of the executed code a particular form when the executed code is authentic.

Both of these types will be explained in more detail in the following.

Execution State that Satisfies a Protocol

This kind of execution state is particularly useful when the execution of the code that is being authenticated outputs data to the entity that is doing the authentication. In this approach, the effect of watermarking the code is to alter the manner in which the data is output to the authenticating entity. Among the ways in which the watermark can affect the manner in which the data is output are the following:

causing the watermarked code to output data in a particular order when the code is executed;
  causing the watermarked code to output particular redundant data along with the data required for the program's proper functioning;
  causing the watermarked code to output data having particular data types; and
  causing the watermarked code to output data that obeys particular constraints.

The watermarker can change one or more of these properties of the output, and can do so differently for each instance of the executable code that is sent from the sender to a recipient.

To give a simple example, the output from the execution of a Java byte code may be treated as an object of the built-in Java class Vector. Objects of this class contain one or more other objects. Each contained object is an element of the Vector object and is referenced by element number. The semantics of the executable program being watermarked requires that the program's output contain certain data; if that data is present and locatable in the Vector object output by the watermarked executable code, the elements of the Vector object may be ordered in any manner and may include any number of elements in addition to the data required by the executable program's semantics. In addition, the additional elements may have varying types and may obey varying constraints relative to each other. For instance, some of the additional elements may be time stamps and the constraints may be that the time stamps satisfy certain temporal conditions relative to an absolute time or to each other.

A watermarker such as watermark embedder 904 receives the byte code to be watermarked and the key as inputs. The key specifies a unique variation of the Vector object output by the executing program and the watermarker responds to the key by modifying the byte code so that it will output a Vector object of the kind specified by the key. The watermarker then sends the key and a description of the variation of the Vector object that the key specifies to the entity that is to authenticate the code being executed. In some embodiments, it may be possible to determine the variation from the key alone, and in that case, only the key need be sent to the entity that is to authenticate the execution of the code.

In the entity that is to authenticate the code being executed, a watermark reader such as watermark detector 911 receives the Vector object output by the code being executed and uses the key and the description of the variation of the vector object that the watermarked code is to output to determine what elements of that object are relevant for the authentication check and the properties those elements must have if the code being executed is authentic. For instance, the key and description may specify that the $9^{th}$ and $21^{st}$ elements of the Vector object contain time stamps and that the timestamp in the $9^{th}$ element is 2 seconds later than the timestamp in the $21^{st}$ element. If the specified elements are not time stamps, or if they do not satisfy the specified constraint, the code being executed is not authentic.

Figure 11:
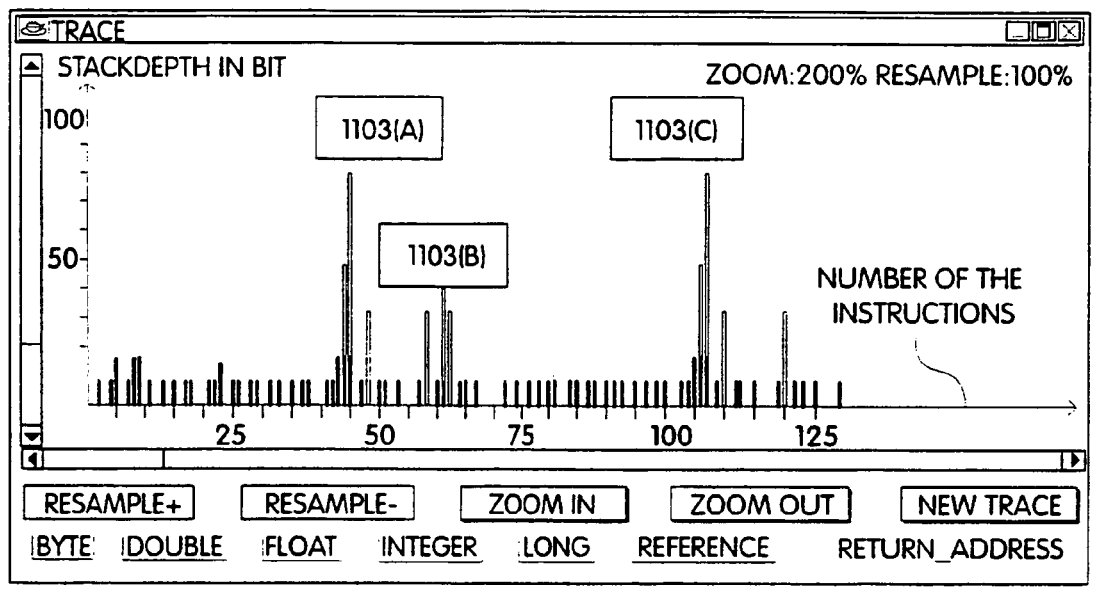
FIG. 11 is a display for a stack depth monitor showing the stack depth during the execution of FIG. 10.

Execution State that Gives an Execution Trace a Particular Form: FIGS. 10 and 11

A problem with watermarking executable code by modifying it so that it varies its outputs is that there are many situations where the outputs produced by the executable code are completely specified by a standard and no variation is possible. In such situations, the modifications of the executable code produced by the watermark can only be permitted to affect the internal execution state of the program. Various techniques are available for obtaining information about the internal execution state of a program. One such technique is shown in FIGS. 10 and 11.

FIG. 10 shows an execution trace 1001 of a portion of the execution of a Java byte code. Execution trace 1001 shows the order in which the bytecodes were actually executed together with additional information about each of the bytecodes. FIG. 11 is a stack monitor 1101 that shows how the depth of the stack maintained by the Java virtual machine varied during the execution traced by execution trace 1001. The numbers along the x axis of the graph of FIG. 11 correspond to the instruction numbers at the left of FIG. 10; the numbers along the y axis specify the depth of the stack in bytes. A vertical line associated with each instruction number shows the depth of the stack when that instruction was executed. Thus, the peak in stack depth labeled 1103(*a*) corresponds to the invocation at instruction 41 in FIG. 10.

A watermarker can be made to modify executable code in such a fashion that the modifications will affect the depth of the stack during program execution. With such a watermarker, modification of the executable code using a particular key produces a graph of stack depth versus executed instruction number that is uniquely associated with the key and the executable code that was watermarked using the key. Thus, the watermarker can watermark the executable code and then execute it to produce the stack depth graph. The stack depth graph becomes the execution state pattern for the watermarked code and is provided along with the key to the authenticating entity's watermark detector. When the watermarked executable code is executed in the receiving system, that system produces a stack depth graph for that execution and provides the stack depth graph to the authenticating entity. The authenticating entity then compares the stack depth graph made at the time of watermarking to the stack depth graph make when the watermarked program is executed in the receiving system. If they are sufficiently similar, the program is authentic.

Of course, things other than the watermark will influence the stack depths reached at various points in a program's execution and thus the execution's stack depth graph. Stack depth graphs from various executions of a program can be made comparable by treating the stack depth graph as a representation of a digital signal, with the depth of the stack being the signal's energy. When this is done, various signal modulation and spread spectrum techniques may be employed to model the behavior of the watermarked program's stack depth graph over many executions. The model may then be uniquely associated with the key used to watermark the program and alterations of the watermarked program may be detected by using the model to analyze the stack depth graphs produced by the watermarked program. By applying the model to a stack depth graph, it is even possible to detect where and to what extent the watermarked program has been altered.

CONCLUSION

The foregoing Detailed Description has disclosed techniques for static and dynamic watermarking of executable code to those skilled in the art of watermarking digital representations and has disclosed the best modes presently known to the inventors of practicing their techniques. In the Detailed Description, the techniques are applied to watermark byte code generated from programs written in the Java™ programming language and to authenticating such byte codes; the techniques are, however not limited to Java byte codes, but may be applied to any kind of executable code. The precise manner in which the techniques are implemented and applied will depend on the kind of executable code and on the use to which the code is put. With regard to the static watermark, the watermark number may be any kind of value and the sequences of codes that represent digits of the value may be any sequences which do not affect any output from the execution of the sequence of instructions. With regard to the dynamic watermark, the property of the execution state affected by the modifications of the code made in response to the key may be any property which remains relatively constant in all executions of the watermarked code. With output from the execution, the properties that are usable for watermarking will depend on the language the code is written in.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed:

1. A method of adding a watermark to a sequence of executable instructions to render the sequence authenticatable, the method comprising the steps of:

receiving the sequence of executable instructions and a key; and using the key to modify the sequence of executable instructions so that the watermark is obtainable from the modified sequence, the sequence being modified such that the usefulness of the modified sequence for the sequence's intended purpose is not affected by the modifications made thereto and the watermark representing a watermark value, alteration or absence of the watermark value being used when the sequence is authenticated to determine whether the sequence is authentic.

2. The method set forth in claim 1 wherein the step of modifying the sequence includes the steps of:
using the key to determine locations in the sequence including modification locations at which the sequence is to be modified; and
modifying the sequence at the modification locations such that the locations specified by the key represent the watermark value,
whereby the watermark value is obtainable from the modification locations.

3. The method set forth in claim 2 wherein the step of modifying the sequence includes the step of:
inserting one or more executable instructions at each of the modification locations, the inserted instructions having no effect on any output from the execution of the sequence of instructions.

4. The method set forth in claim 3 wherein:
the instructions at the locations specified by the key represent values of digits of the watermark value.

5. The method set forth in claim 1 further comprising the step of:
providing the watermark value to an authenticating entity that authenticates the watermarked code.

6. The method set forth in claim 1 further comprising the step of:
providing the key to the authenticating entity.

7. The method set forth in claim 1 wherein:
the modified sequence of executable instructions is modified such that when the modified sequence of executable instructions is executed, execution state is produced which has a property that depends on the key,
whereby the watermark value is a description of execution state from the modified sequence.

8. The method set forth in claim 7 wherein:
the execution state is a stack depth graph.

9. The method set forth in claim 7 wherein:
the execution state is output from the execution.

10. The method set forth in claim 9 wherein:
the property is an order of elements in the output.

11. The method set forth in claim 9 wherein:
the property is an additional element in the output.

12. The method set forth in claim 9 wherein:
the property is a class of an element in the output.

13. The method set forth in claim 9 wherein:
the property is a constraint that is satisfied by elements of the output.

14. The method set forth in claim 7 further comprising the step of:
providing a description of the produced execution state to an authenticating entity that authenticates the watermarked code.

15. The method set forth in claim 14 further comprising the step of:
providing the key to the authenticating entity.

16. The method set forth in claim 1 further comprising the step of
providing the key to an authenticating entity that authenticates the sequence.

17. A method of authenticating a watermarked sequence of executable instructions, the watermark having been produced by modifying the sequence according to a key such that certain of the instructions in the sequence represent a watermark value,
the method comprising the steps of:
receiving the watermarked sequence or a copy thereof;
using the key to locate the certain instructions in the received sequence and read the watermark value; and
using alteration or absence of the watermark value to determine whether the received sequence is authentic.

18. The method of authenticating set forth in claim 17, the method further comprising the step of:
receiving another watermark value; and
in the step of using alteration or absence of the watermark value to determine whether the received sequence is authentic, the watermark value is compared to the other watermark value.

19. The method of authenticating set forth in claim 18, the method further comprising the step of:
receiving the key.

20. A method of authenticating a sequence of executable instructions that has been watermarked by modifying the sequence according to a key such that when the sequence is executed, first execution state is produced,
the method comprising the steps of:
receiving a description of second execution state; and
if the received description does not describe the first execution state, determining that the sequence of executable instructions whose execution produced the second execution state is not authentic.

21. The method set forth in claim 20 further comprising the step of:
receiving another description of the execution state, the other description describing execution state produced by the execution of the modified sequence; and
in the step of determining, comparing the description and the other description.

22. The method set forth in claim 21 wherein:
the other description is a stack depth graph.

23. The method set forth in claim 20 wherein the execution state is output from the execution, the output having a property which can be determined using the key and the method further comprises the steps of:
receiving the output from the execution; and
the step of determining includes the steps of
receiving the execution state;
employing the key to determine the property; and
comparing the determined property with the received description.

24. The method set forth in claim 23 wherein:
the determined property is an order of elements in the output.

25. The method set forth in claim 23 wherein:
the determined property is an additional element in the output.

26. The method set forth in claim 23 wherein:
the determined property is a class of an element in the output.

27. The method set forth in claim 23 wherein:
the determined property is a constraint that is satisfied by elements of the output.

* * * * *